US011447326B2

(12) United States Patent
Risch

(10) Patent No.: US 11,447,326 B2
(45) Date of Patent: Sep. 20, 2022

(54) SYSTEM AND METHOD FOR A REUSABLE DISPENSING CONTAINER

(71) Applicant: Thomas M. Risch, Westport, CT (US)

(72) Inventor: Thomas M. Risch, Westport, CT (US)

( * ) Notice: Subject to any disclaimer, the term of this patent is extended or adjusted under 35 U.S.C. 154(b) by 0 days.

(21) Appl. No.: 17/127,275

(22) Filed: Dec. 18, 2020

(65) Prior Publication Data
US 2021/0188527 A1 Jun. 24, 2021

Related U.S. Application Data

(60) Provisional application No. 62/950,906, filed on Dec. 19, 2019.

(51) Int. Cl.
| | | |
|---|---|---|
| *B65D 83/42* | (2006.01) | |
| *B65D 83/64* | (2006.01) | |
| *B65D 83/62* | (2006.01) | |
| *B65B 31/00* | (2006.01) | |

(Continued)

(52) U.S. Cl.
CPC ........ *B65D 83/425* (2013.01); *B05B 11/0039* (2018.08); *B05B 11/0056* (2013.01); *B05B 11/0097* (2013.01); *B05B 11/00446* (2018.08); *B65B 31/003* (2013.01); *B65B 31/04* (2013.01); *B65D 83/42* (2013.01); *B65D 83/62* (2013.01); *B65D 83/64* (2013.01)

(58) Field of Classification Search
CPC ...... B65D 83/425; B65D 83/42; B65D 83/62; B65D 83/64; B05B 11/00446; B05B 11/039; B05B 11/0056; B05B 11/0097; B65B 31/003; B65B 31/04
USPC ........................................................ 141/113
See application file for complete search history.

(56) References Cited

U.S. PATENT DOCUMENTS 2,841,190 A 1/1957 Scheck
3,362,589 A * 1/1968 Kinnavy ................ B65D 83/64
222/389

(Continued)

FOREIGN PATENT DOCUMENTS

EP 0361091 4/1990
FR 2893315 5/2007

OTHER PUBLICATIONS

Anna Kania; Innovations at Lindal, Lindal Group; Oct. 25, 2018; pp. 3, 11-13, 15-19, 24-26; www.lindalgroup.com, Oct. 25, 2018.

*Primary Examiner* — Vishal Pancholi
(74) *Attorney, Agent, or Firm* — Simpson & Simpson, PLLC

(57) ABSTRACT

A reusable dispensing container assembly, having a canister having a first end and a second end, the canister having an upper chamber to hold dispensable substance, an actuator arranged proximate the first end of the canister, in communication with the chamber, the actuator having a nozzle arranged to eject the dispensable substance, and, a deformable piston arranged within the canister below the upper chamber, the piston further arranged to sealingly engage an inner surface of the canister, the piston arranged for upward movement within the canister when the actuator is actuated, the deformable piston forming a lower chamber arranged to hold pressurized gas, the deformable piston comprising at least one integral external O-ring about its circumference arranged to sealingly engage the inner surface of the canister and maintain separation of the dispensable substance and the pressurized gas.

11 Claims, 12 Drawing Sheets

(51) Int. Cl.
*B65B 31/04* (2006.01)
*B05B 11/00* (2006.01)

(56) References Cited

U.S. PATENT DOCUMENTS

| | | | |
|---|---|---|---|
| 3,381,863 A * | 5/1968 | Towns | B65D 83/64 |
| | | | 222/386.5 |
| 3,675,821 A * | 7/1972 | Morane | B65D 83/64 |
| | | | 222/80 |
| 3,869,072 A | 3/1975 | Eyerdam et al. | |
| 3,915,352 A * | 10/1975 | Scheindel | B65D 83/64 |
| | | | 222/389 |
| 4,032,064 A | 6/1977 | Giggard | |
| 4,150,522 A | 4/1979 | Burger | |
| 4,171,757 A * | 10/1979 | Diamond | B65D 83/64 |
| | | | 222/389 |
| 4,562,942 A * | 1/1986 | Diamond | B65D 83/62 |
| | | | 222/386.5 |
| 4,877,156 A * | 10/1989 | Clanet | B65D 83/64 |
| | | | 222/386.5 |
| 5,343,904 A | 9/1994 | Kaeser | |
| 5,462,099 A | 10/1995 | Demarest et al. | |
| 5,505,039 A | 4/1996 | Maier | |
| 5,623,974 A | 4/1997 | Losenno et al. | |
| 5,971,228 A * | 10/1999 | De Laforcade | B65D 83/64 |
| | | | 222/389 |
| 6,196,275 B1 | 3/2001 | Yazawa et al. | |
| 6,230,762 B1 * | 5/2001 | Baudin | B05B 11/00416 |
| | | | 141/20 |
| 6,651,847 B2 | 11/2003 | Mekata et al. | |
| 6,883,564 B2 | 4/2005 | Risch et al. | |
| 7,222,646 B2 * | 5/2007 | Gupta | B65D 83/64 |
| | | | 141/2 |
| 8,002,000 B2 | 8/2011 | Pericard | |
| 8,196,620 B2 | 6/2012 | Fransen | |
| 8,328,047 B2 | 12/2012 | Walters et al. | |
| 8,844,584 B1 | 9/2014 | Haley et al. | |
| 9,376,228 B1 | 6/2016 | Haley et al. | |
| 9,950,821 B2 | 4/2018 | Smith | |
| 10,052,643 B2 | 8/2018 | Moretti | |
| 2005/0016622 A1 * | 1/2005 | Risch | B65D 83/42 |
| | | | 141/113 |
| 2007/0125809 A1 * | 6/2007 | Regan | G05D 16/10 |
| | | | 222/389 |
| 2007/0145079 A1 | 6/2007 | Casamento et al. | |
| 2007/0221685 A1 | 9/2007 | Wheatley | |
| 2007/0282295 A1 | 12/2007 | Horn | |
| 2016/0159519 A1 | 6/2016 | Chism et al. | |
| 2017/0361962 A1 | 12/2017 | Abramowicz et al. | |
| 2018/0334313 A1 | 11/2018 | Smith | |

\* cited by examiner

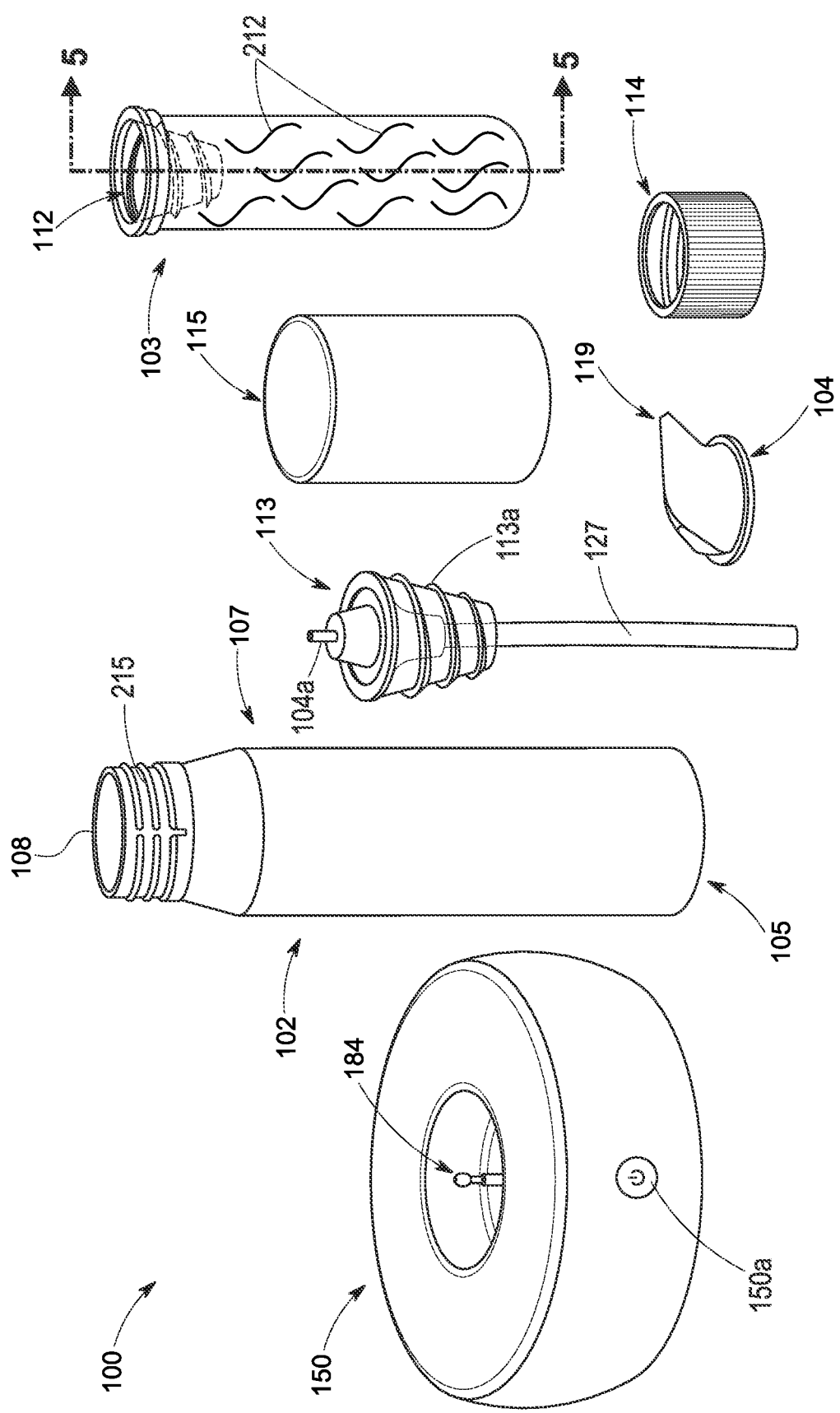

SYSTEM AND METHOD FOR A REUSABLE DISPENSING CONTAINER

CROSS-REFERENCE TO RELATED APPLICATION

This application claims the benefit under 35 U.S.C. § 119(e) of Provisional Application No. 62/950,906, filed on Dec. 19, 2019, which application is incorporated herein by reference in its entirety.

FIELD OF THE INVENTION

The present invention relates generally to a system and method for pressurizing pressurized dispensers. More particularly, this invention relates to refillable dispensers having a piston or a multilayered bag.

BACKGROUND

Pressurized aerosol containers are used to dispense cooking oils, grooming products such as hairspray and deodorant, window cleaners, etc. In most cases, regardless of what the containers dispense, they are pressurized at the point of filling by the addition of some sort of propellant gas. The containers are single-use items that need to be completely emptied and cut apart to be properly recycled and, even then, the containers may be improperly disposed of, resulting in polluting the environment and adding to the carbon footprint.

Traditional aerosol cans are also designed to mix the propellant with the product. Therefore, a product that may take extended periods of time to develop, manufacture and approve, must then be mixed with propellent. Some pressurized aerosol containers utilize a bag-on-valve system (B.O.V.) developed to improve the quality of cosmetic, medical or food products.

The B.O.V.s keep the product separate from the propellant, typically housing it in a film laminate bag, which is welded to an aerosol valve. This configuration maintains the integrity of the product whereby the product remains separate from propellants at all times. Typically B.O.V.s are used in metal cans with a one inch opening for crimping the valve which is welded to a foil based packaging bag with multilayer film laminate. Once compressed air or nitrogen is filled into the area between the bag and can the valve is then crimped. This process is called "under the cup gassing" and keeps the product and propellant separate at all times. However, though safer on the environment, the B.O.V.s are still disposed after a single use. Thus, there exists a need for a pressurized dispenser that has a bag capable of being refilled and replaced that is easy to operate and accessible to various users.

Further, B.O.V.s still have a reusability issue. In order to prevent cross-contamination the B.O.V.s need to be cleaned in between uses of different substances. After multiple cleanings, a B.O.V. may begin to wear out or lose structural integrity.

Thus, there is also a long-felt need for an internal piston within a pressurized canister that moves vertically as the canister is pressurized to push a substance out of the canister when actuated for dispensing. There is a further need for a piston that can be removed from a canister in order to facilitate cleaning. Additionally, there is a further need to provide for a pressurized canister station that has a needle that may also depressurize the canister. Lastly, there is a need to reduce the number of components in a reusable pressurized canister.

SUMMARY

The present invention broadly comprises a reusable dispensing container assembly, having a canister having a first end and a second end, the canister having an upper chamber to hold dispensable substance, an actuator arranged proximate the first end of the canister, in communication with the chamber, the actuator having a nozzle arranged to eject the dispensable substance, and, a deformable piston arranged within the canister below the upper chamber, the piston further arranged to sealingly engage an inner surface of the canister, the piston arranged for upward movement within the canister when the actuator is actuated, the deformable piston forming a lower chamber arranged to hold pressurized gas, the deformable piston comprising at least one integral external O-ring about its circumference arranged to sealingly engage the inner surface of the canister and maintain separation of the dispensable substance and the pressurized gas.

The present invention also broadly comprises a reusable dispensing container assembly, having a pressurization station having a pressurizing and de-pressurizing needle, the needle having a rounded tip, a canister having a first end and a second end, a mating portion arranged on the first end of the canister, the mating portion having a first end and a second end, the first end having a fixedly secured bag arranged to fit internally within the canister, an actuator arranged on the second end of the mating portion, the actuator having a nozzle, and, a valve arranged on the second end of the canister operatively arranged to engage the needle.

A primary object of the present invention is to provide a pressurized canister arranged to dispense a substance that may be reusable such that the canister may be re-pressurized to dispense another substance.

A secondary object of the present invention is to provide a pressurized canister having a deformable piston that is arranged to pressurize the canister that may also be removed from the canister.

A further object of the present invention is to provide a pressurized canister having a valve arranged to accept a needle from a pressurizing base that may pressurize or depressurize the canister.

Still, another object of the present invention is to provide a pressurized canister having an internally arranged bag that is arranged to hold a dispensable substance.

These and other objects, features, and advantages of the present disclosure will become readily apparent upon a review of the following detailed description of the disclosure, in view of the drawings and appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure, in which:

FIG. 1A illustrates a perspective view of the separate components of a first embodiment of the reusable dispensing container system;

DETAILED DESCRIPTION

Figure 1B:
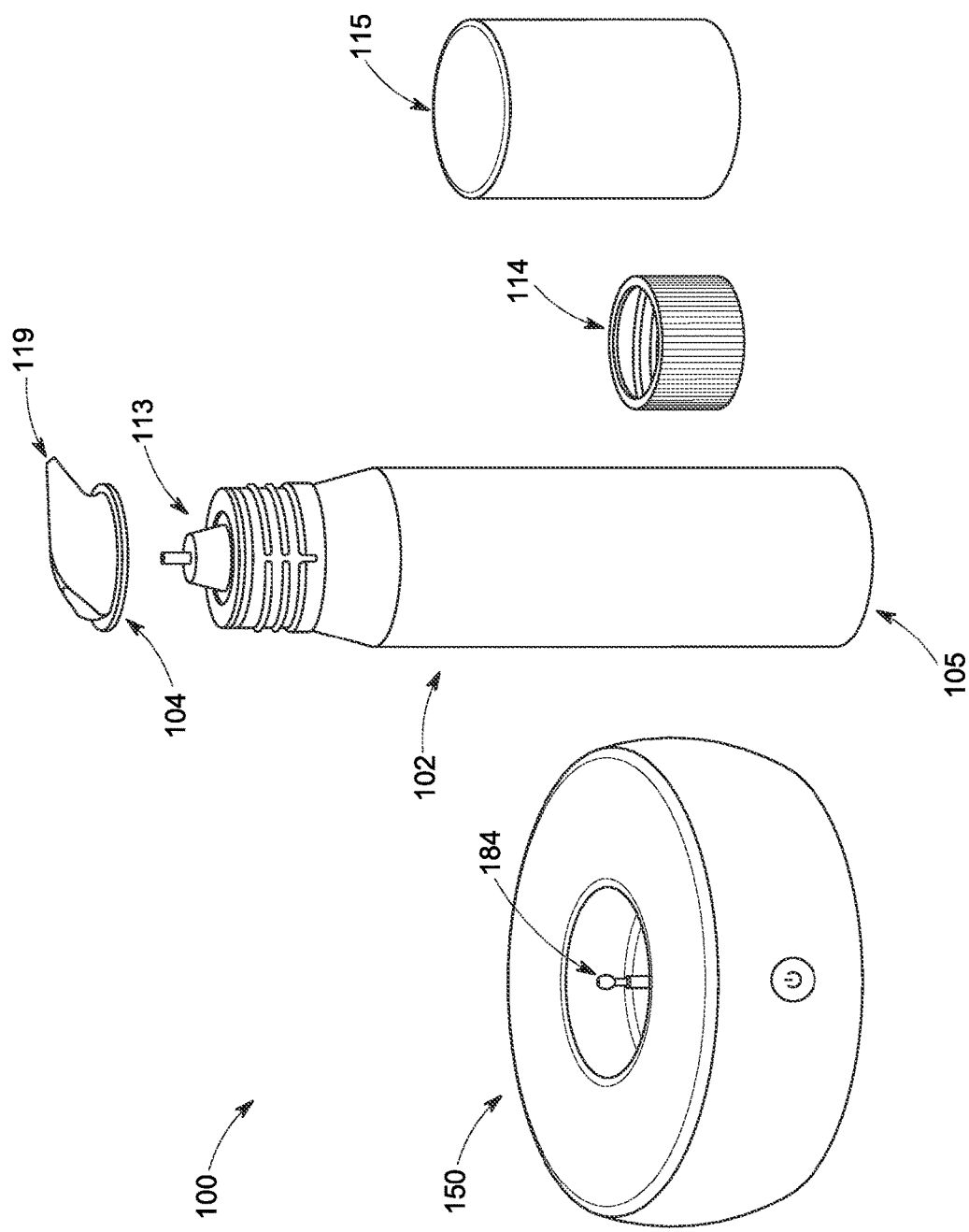
FIG. 1B illustrates a perspective view of a reusable dispensing container system shown in FIG. 1A with the valve cup placed in position on the bag.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. For example, the terms "canister," "canister," and "container" are specific interchangeable terms that appear in the following description.

The present disclosure is generally drawn to a system and method, according to one or more exemplary embodiment for a dispensing container having an internal bag, the bag having an external surface with raised portions, such as external ribs on the perimeter of the bag, to allow air to surround bag and to prevent the bag from sticking to the internal walls of the canister, the dispensing container connected to a small battery powered air compressor having a fill needle with a rounded and substantially spherical-shaped head. The internal bag allows the dispensing container to spray from any angle while separating the liquid from the pressurized air, whereby the liquid from the bag is expelled through a dip tube to an applicator connected to the canister, producing an airless spray eliminating over spray that cannot be contaminated. The small battery powered air compressor makes recharging the sprayer very convenient whereby the dispenser may be refilled, pressurized, or depressurized at any remote location.

The present disclosure is also generally drawn to a system and method, according to one or more exemplary embodiments for a dispensing container having an internal piston, having externally arranged annular ridges arranged to sealably contact the internal surface of the container as to create an upper and lower chamber within the container, the container also having a valve arranged to connect to a small battery powered air compressor having a fill needle with a rounded and substantially spherical-shaped head. The internal piston allows the dispensing container to spray from any angle while keeping the dispensable substance in the upper chamber and pressurized air in the lower chamber, producing an airless spray eliminating over spray that cannot be contaminated. The small battery powered air compressor makes recharging the sprayer very convenient whereby the dispenser may be refilled, pressurized, or depressurized at any remote location.

Figure 1C:
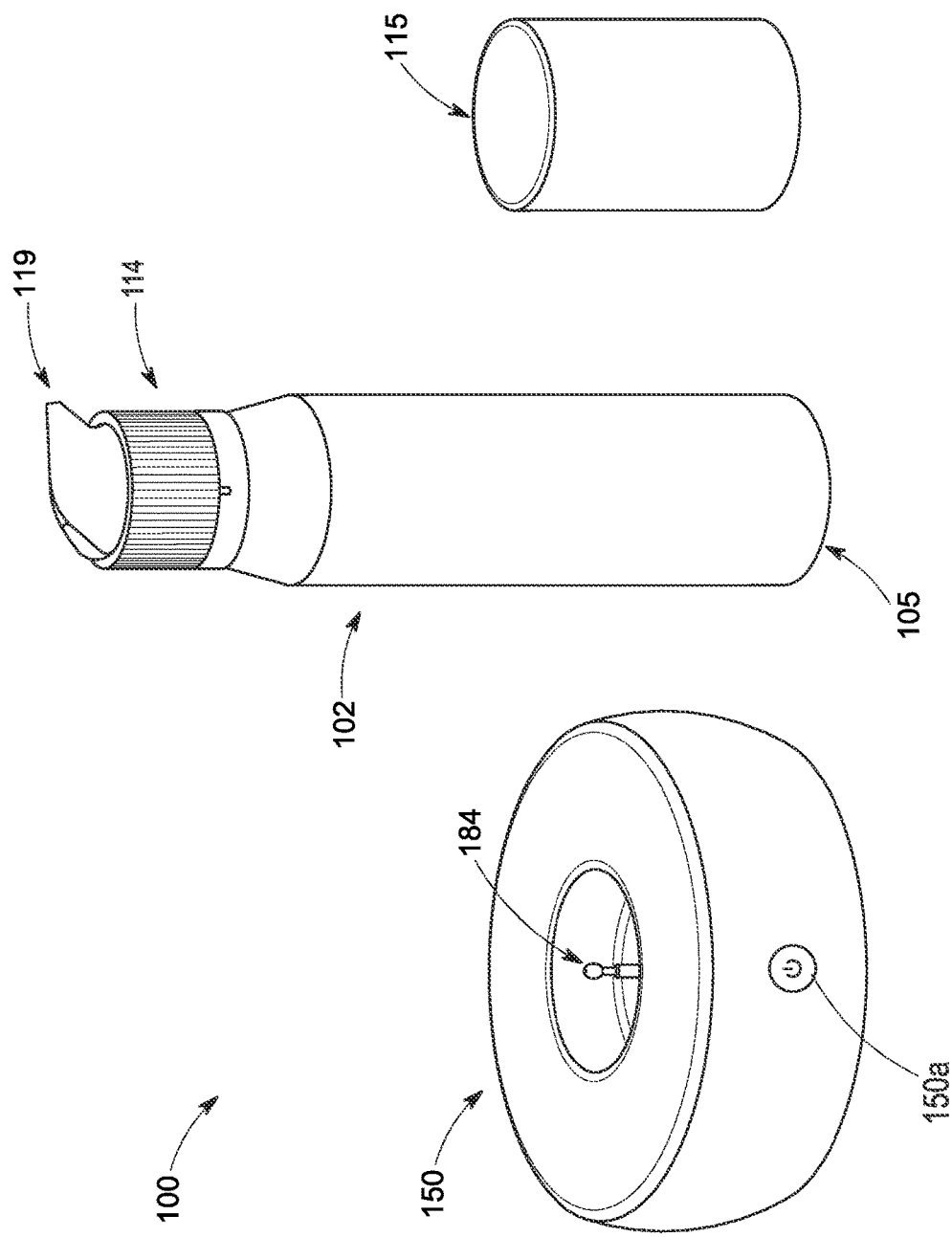
FIG. 1C illustrates a perspective view of a reusable dispensing container system shown in FIG. 1A with the actuator placed in position on the valve cup and the cover piece fitted over the canister to mechanically lock actuator with the canister and bag.
Figure 1D:
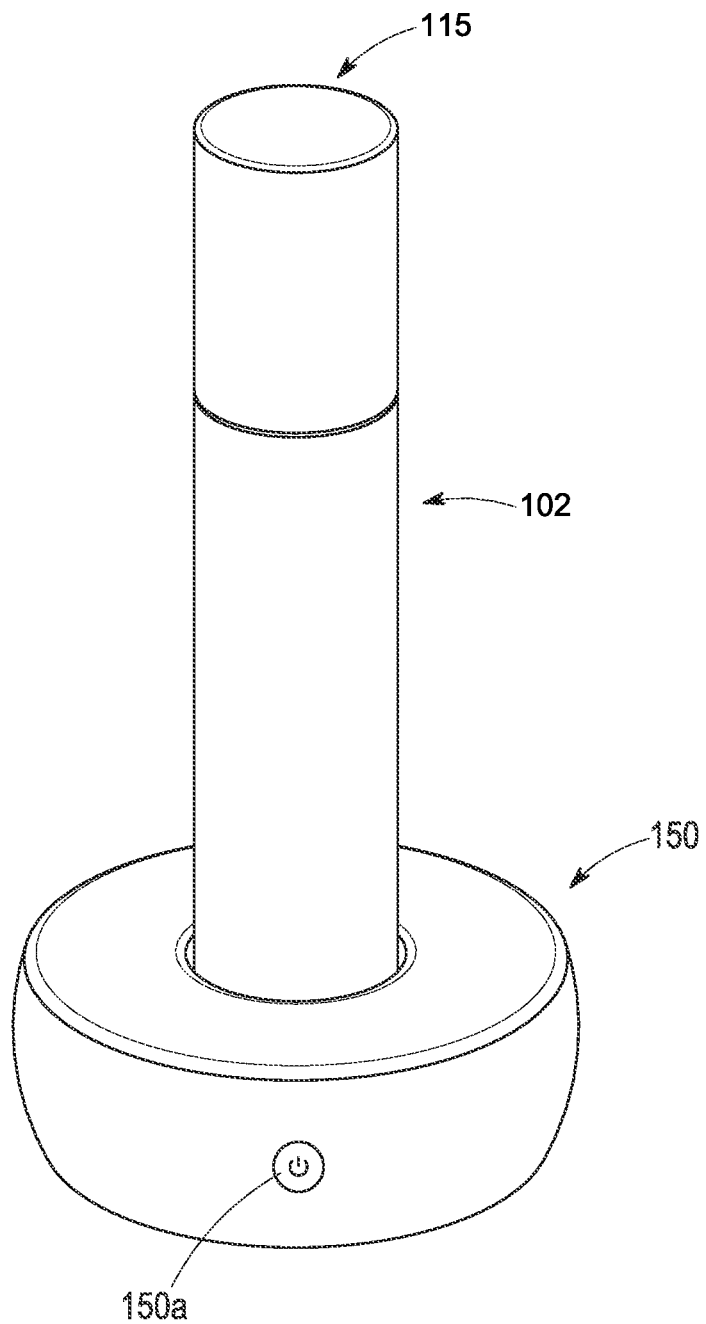
FIG. 1D illustrates a perspective view of a reusable dispensing container docked to a pressurizing system of either the first or second embodiments of the present invention.

Adverting now to the figures, FIG. 1 illustrates a first embodiment of a reusable dispensing container system 100 according to the present invention. Dispensing container system 100 may include a fluid tight compartment defined by a canister 102 connected to an actuator 104. Canister 102 may have an enclosing bag 103. Bag 103 allows dispensing container system 100 to spray from any angle while also separating liquid or other solutions inside the bag from surrounding pressurized air so as to prevent cross contamination from the pressurized air in canister 102. Bag 103 may operate as reservoir for a variety of liquids as well as viscous products, such as gels, creams and ointments, in a number of application areas including oxygen-sensitive and sterile products that may be safely separated from pressurized air.

Bag 103 may be continuous and without seams. Bag 103 may be comprised of a circumferential sidewall with a bottom defined by a circle. Bag 103 may have an opening 112 formed at the top of bag 103. The circumferential sidewall and bottom of bag 103 may be sealed using methods known by those of ordinary skill in the art. Bag 103 may be comprised of layers of foldable resilient silicone, rubber, or other stretchable elastomeric (such as three or four layers depending on product requirements). Bag 103 may have series of ridges or bumps on the surface of bag 103 that prevent bag 103 from sticking to the internal walls of canister 102 In other limiting embodiments bag 103 may be plastic, metal, or in other non-limiting embodiments another suitable material. The layers offer a superior barrier which eliminates the possibility of oxidation and cross contamination. The various types of construction of bags are well-known in the art and the particular method of manufacture is not intended to limit the present invention in any way.

The interior and exterior of bag 103 may be fabricated in a manner which enables bag 103 to remain flexible, yet provides a significant barrier between the contents of the bag 103 and the pressurized air in canister 102 surrounding bag 103. The exterior of bag 103 may have a surface with raised portions 212 such as a plurality of dots, ribs or protrusions to facilitate the circulation of pressured air surrounding bag 103 within the container and keep bag 103 from bunching up and inadvertently sealing to the inside of canister 102 and allowing the dip tube to poke a hole in bag 103. Raised portions 212 also ensure bag 103 does not stick to the internal walls of canister 102. Bag 103 may be shaped and designed with a thickened top portion to provide better stability and durability for multiple uses including removal and replacement of actuator 104 onto canister 102.

Opening 112 may have a lipped portion protruding outward on the exterior of upper surface boundary. The lipped portion allows bag 103 to engage and rest inside canister 102 with the lipped portion resting upon the upper portion of canister 102. This configuration permits cover piece 114 to be fitted around canister 102 and to mechanically lock actuator 104 with canister 102 and bag 103. Lipped portion may have a series of grooves or other fasteners to hold bag 103 in place.

Figure 2:
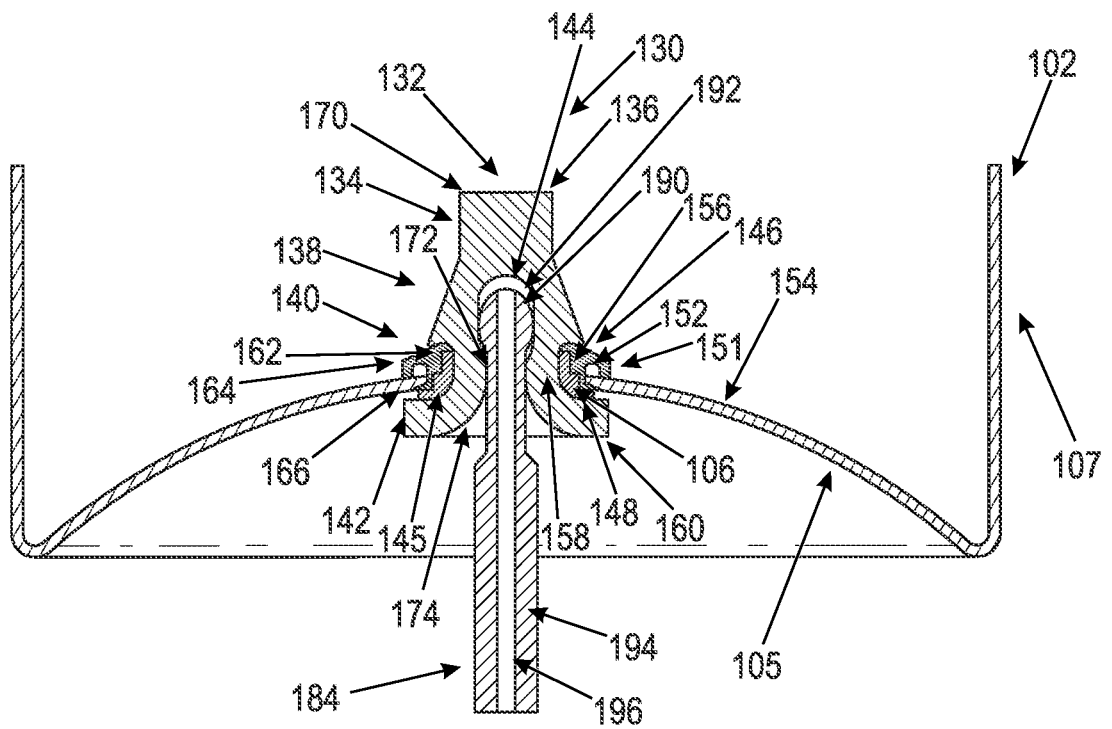
FIG. 2 is a longitudinal section of a lower end of the container positioned atop and engaging a needle of the pressurizing system of either the first or second embodiments of the present invention, wherein the container is provided with a preferred embodiment of a valve.
Figure 3:
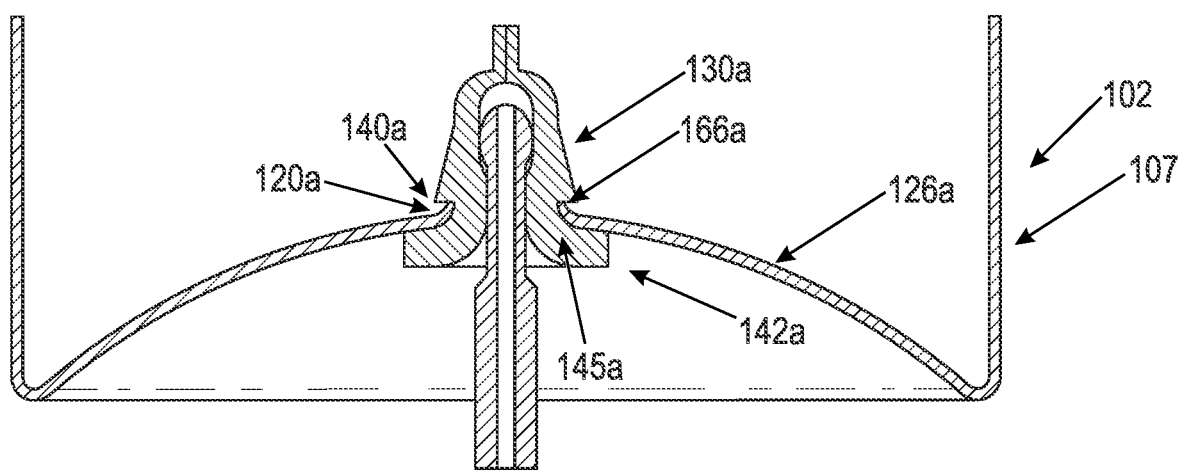
FIG. 3 is a longitudinal section of a lower end of the container positioned atop and engaging a needle of the pressurizing system of either the first or second embodiment of the present invention, wherein the container is provided with a second embodiment of the valve shown rotated 90° relative to the valve in FIG. 2.

Canister 102 may be comprised of the same material as a standard aerosol can such as plastic or metal. Canister 102 may be comprised of a base 105 whereby base 105 is preferably concave at its exterior surface (and convex at its interior), as shown in FIGS. 2 and 3, having an aperture 106 in the center of base 105. Canister 102 may have a circumferential sidewall 107 projecting upwardly from base 105. The lower portion of sidewall 107 may be tubular in shape having a consistent diameter throughout extending to the upper portion of sidewall 107. Upper portion of sidewall 107 may be defined by a shape having an upper area of less diameter than the bottom area of the upper portion of sidewall 107, the upper portion extending upwards until forming a circular opening 108. In other non-limiting embodiments, opening 108 may be square, rectangular, oval, triangle, trapezoid, octagon, or hexagon in shape.

Canister 102 may have threaded portion 215 on the exterior of upper surface boundary near opening 108. Threaded portion 215 may also have one or more vertical air pressure relief slots. Threaded portion 215 is configured to allow cover piece 114 to engage and mechanically lock actuator 104 with canister 102 and bag 103.

The fluid contents in bag 103 may be sealed by valve cup 113, shown away from bag 103 in FIG. 1A and on bag 103 in FIG. 1B. Valve cup 113 may be injection molded plastic and fits into a region-formed by the upper portion of circumferential sidewall of bag 103 and opening 112 that may be threaded to engage threaded portion 113a of valve cup 113. Valve cup 113 may be sized to be frictionally held by bag 103. Valve cup 113 may carry a vent tube (not shown) for communicating atmospheric pressure to the liquid within the bag 103. Valve cup 113 may have radially extending lip which is positioned immediately above opening of bag 103 which includes a substantially horizontal and flat surface suitable for being sealingly engaged by a connected actuator 104 via attachment means 104a and cover piece 114. Attachment means 104a may be a hollow stem that protrudes from valve cup 113, similar to those found in single use spray paint cans. Valve cup 113 may include a dip tube 127 which downwardly extends into bag 103 to pick up the liquid contained therein. Dip tube 127 may be configured for feeding liquid from bag 103. With this arrangement there is substantially no leakage of liquid from the container during use, even if bag 103 and canister 102 are inverted.

Valve cup 113 may have threaded portion 113a around the exterior of valve cup 103. Threaded portion 113a allows valve cup 113 to sealably engage with bag 103. In operation, valve cup 113 may be lowered until threads 113a of valve cup 103 contact interior threads of bag 103. Valve cup 113 is then rotated clockwise on the correlating threads. As valve cup 113 is further rotated clockwise, downwardly, the lip of valve cup 113 comes into contact with the lip of canister 102. The bottom portion of valve cup 113 move downward past the lip of bag 103 whereby valve cup 113 is then movably retained, allowing valve cup 113 to further advance downwardly into the closed position. This engagement applies a radial force inward and downward force to create a substantially air-tight seal that prevents exiting of liquid and gas from bag 103 unless through valve cup 113. Valve cup 113 may be removed by applying a force greater than the radial force, such as by a user rotating valve cup 113 in a counterclockwise motion and then pulling valve cup 113 away from bag 103. The securing configuration described above is shown in greater detail in FIGS. 5-6, and 9, and discussed in greater detail infra.

The fluid contents in bag 103 may be released by an actuator 104, shown away from valve cup 113 in FIG. 1A and on valve cup 113 in FIG. 1B whereby actuator 104 may be connected, fastened to, or integral to valve cup 113. Actuator 104 may have a flat bottom surface and a curved vertical side wall extending from the flat bottom surface to a nozzle 119. Nozzle 119 may be connected to dip tube 127 of valve cup 113. Nozzle 119 may further be configured to be an outlet for the contents with the bag 103. Actuator 104 may also operate as trigger mechanism such that when trigger mechanism is depressed, fluid is forced from bag 103 into dip tube 127, and then out through nozzle 119. When actuator 104 is manipulated or actuated by a user a vacuum is produced in the dip tube 127 attached to valve cup 113. This vacuum in dip tube 127 in combination with atmospheric pressure on the upper surface of the liquid within bag 103 causes the liquid to flow up dip tube 127 and into actuator 104 where it is forced through the orifice of nozzle 119.

Canister 102 and actuator 104 may be mechanically locked together by cover piece 114, shown away from canister 102 in FIG. 1A and covering canister 102 and actuator 104 in FIG. 1C. Cover piece 114 may be cylindrical in shape. Cover piece 114 may function so that when screwed onto canister 102 via threads 215, cover piece 114 acts as a reinforcing seal and prevents any leakage of fluid in bag 103 during a stationary state and as the fluid exits bag 103. In one or more embodiments cover piece 114 may be configured to screw onto canister 102 and over actuator 104. In one example arrangement, cover piece 114 may have a threaded portion on the interior of upper surface boundary near opening 108. The threaded configuration allows cover piece 114 to engage and mechanically lock actuator 104 with canister 102 via threads 215 and thus the contained bag 103.

Cover piece 114 may be lowered until interior threads contact threads 215 of canister 102. Cover piece 114 is then rotated clockwise on the correlating threads. As cover piece 114 is further rotated clockwise, downwardly, the internal threads of cover piece 114 comes into contact with actuator 104 and cover actuator 104 whereby cover piece 114 is then movably retained after being fully twisted onto canister 102. This engagement applies a radial force inward and downward to create a substantially air-tight seal that prevents exiting of liquid and gas from canister 102. Cover piece 114 may be removed by applying a force greater than the radial force, such as by a user rotating actuator 104 and then pulling cover piece 114 away from canister 102.

Lid 115 may be fit over cover piece 114, shown away from canister 102 in FIG. 1A and FIG. 1B and on canister 102 in FIG. 1C. Lid 115 may be structured to form a friction fit with the upper portion of sidewall 107 of canister 102 when lid 115 is positioned on top of canister 102. When positioned on top of canister 102, a portion of canister 102 rests inside the recess of lid 115 whereby lid 115 provides an aesthetically pleasing look to dispensing container system 100 having the other components such as actuator 104 and cover piece 114 covered by lid 115.

Turning to FIG. 2, hole 106 at base 105 of canister 102 may be provided with a valve 130 made of rubber or any other suitable material, the valve being generally of the duck-bill variety. Valve 130 may include an upper split portion 132 defining two relatively flat "bills" 134, 136 that meet to provide a seal, a generally frustoconical section 138 expanding downward and terminating in a barb 140, a lower annular flared flange 142, and an interior space 144. An annular groove 145 is defined between the barb 140 and the flange 142.

Valve 130 may be stabilized within hole 106 with an annular catch 146 which resides at the circumference of hole 106 and a resilient annular strain relief member 148 which engages the inner portion of catch 146. More particularly, catch 146 includes ring groove 151, a barb projection 156, inner rim 158, and a side wall 160. When catch 146 is positioned at the hole 106 from inside the canister 102, side wall 160 fits against the circumference of hole 106 to position catch 146 concentrically with hole 106. The ring groove 151 holds an O-ring 152 against the interior surface of the bottom 105 of the canister 102 to provide a fluid tight seal. The strain relief member 148 includes an upper barb 162 and a groove 164. When the strain relief member is pushed through catch 146 from bottom 105 of the canister 102 (i.e., from outside the canister), barb 162 seats over inner rim 158 of catch 146, and inner rim 158 is engaged within the groove 164.

Valve 130 may then be pushed through the lower end of the strain relief member 148 such that the frustoconical portion 138 resides within canister 102 and barb 140 passes through and seats above projections 156 of catch member 146. Catch member 146 and strain relief member 148 may be positioned within and about the annular groove 145 in valve 130 (with the barb 140 of valve 130 seating above members 146 and 148, and flared flange 142 of valve 130 seating below members 146 and 148). This configuration locks valve 130 relative to the bottom of the canister 102 and provides a fluid tight seal about the valve's periphery. Importantly, where hole 106 in the canister 102 is a punched hole with potentially sharp edges 166, catch 146 and strain relief 148 operate to shield such sharp edges from contact with valve 130, thereby preventing damage to valve 130 that may otherwise occur. The interior space of valve 130 may include a relatively large first portion 170, a reduced diameter neck portion 172, and a flared third portion 174. It should also be appreciated that interior space 144 of valve 130 provides a configuration that locks head portion 190 of needle 184 into place such that canister 102 will not release or disengage from valve 130 while canister 102 is pressurized unless a user physically pulls canister 102 away from needle 184. This configuration of valve 130 is incorporated by reference via U.S. Pat. No. 6,883,564 in its entirety.

Turning now to FIG. 3, illustrating a second embodiment of the coupling between a valve 130a and the canister 102 that is shown rotated 90° with respect to FIG. 2. Valve 130a may include an upper portion 132a defining two protrusions. In the second embodiment, edge 166a at the bottom 126a of the canister 102 may be bent inward (i.e., upturned) to provide a rounded contour. In such an embodiment, the rounded contour is unlikely to cause damage to the valve 130a. Thus, the catch 146 and strain relief 148 (FIG. 2) are not as advantageous and may be eliminated. If eliminated, the annular groove 145a about the valve 130a is preferably reduced in width (the dimension between the barb 140a and the flange 142a) to correspond to the upturned portion of the bottom 126a, while the other aspects of the valve preferably substantially remain the same. The valve 130a is then pushed through the hole 128a such that the barb 140a of the valve 130a resiliently deforms, passes through the hole, and then expands to capture the upturned edge 166a within the annular groove 145a, between the barb 166a and the flange 142a.

Figure 4:
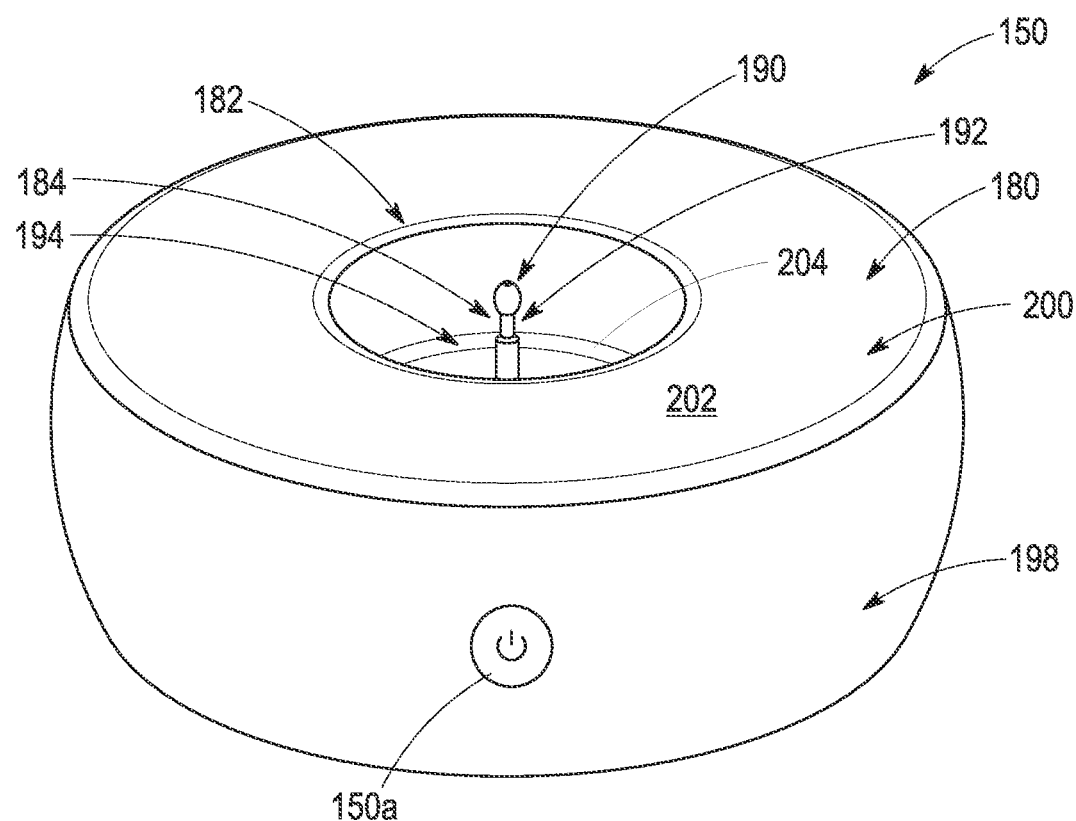
FIG. 4 is a perspective view of the pressurizing system of either the first or second embodiment of the present invention.

Referring now to FIG. 4, canister 102 may be connected to a pressurization station 150. Pressurization station 150 may include a housing 180 having an external dock 182 for receiving the lower end of canister 102 and a hollow needle 184 at the center of external dock 182. Needle 184 may be coupled to a compressor within housing 180. pressurization station 150 may also include appropriate circuits, switches, and other components, to activate the compressor, and other essential components, not shown, but which are well known in the art. For example, U.S. Pat. No. 6,883,564 Risch; U.S. Pat. No. 5,623,974 to Losenno et al.; U.S. Pat. No. 5,462,099 to Demarest et al.; and U.S. Pat. No. 5,343,904 to Kaeser disclose the essential elements within a docking station and are hereby incorporated by reference herein in their entireties.

Pressurization station 150 may have a power system designed to provide the energy to the circuits, switchers, and other components of station during the process of pressurizing canister 102. Pressurization station 150 may be powered by methods known by those of ordinary skill in the art and is shown in FIG. 4 with power button 150a. In some embodiments, pressurization station 150 may plug into an electrical outlet using an electrical cord to supply power to the circuits and components of pressurization station 150. Further power system may include a rechargeable battery pack whereby the rechargeable battery is of a charge, design, and capacity, to provide sufficient power to the circuits and components of pressurization station 150 during operation for a set period of time needed to pressurize canister 102.

In some non-limiting embodiments the pressurization station may have one or more battery compartments for receiving and holding batteries such as but not limited to AA or AAA sized conventional batteries. The battery compartment may include one or more electrodes (e.g. conventional electrodes) that are configured to contact electrically conductive surfaces of the battery received inside the compartment. The battery compartments are selectively accessible by removal of a latch cover whereby the battery compartments and the batteries are accessible only when the user removes a removable battery cover or latch mechanism concealing the battery compartment from external view. Pressurization station 150 may include a latch receiving component that engages with the latch cover concealing battery compartment to facilitate removal and reattachment of the latch cover from pressurization station 150.

Needle 184 may include an enlarged generally oval shaped head portion 190, a reduced diameter neck portion 192, and a relative larger diameter base portion 194. An axial through bore 196 is defined therethrough. Head portion 190 of needle 184 may be an enlarged generally oval shaped, a round and substantially spherical-shaped, or any other shape that does not have the defined edges associated with prior art needles having a frustoconical shape that, necessarily, have a defined edge on the circular base. The interior space 144 of valve 130 accommodates head portion 190 and neck portion 192 of needle 184, with head 190 fitting within first portion 170 of space 144, and neck portion 192 of needle 184 fitting diametrically snugly within neck portion 172 of the space and extending within the flared third portion 174 of space 144. Bills 134 and 136 are located higher than the head 190 of the needle 184, such that even when the needle is fully inserted into the valve 130, valve 130 remains closed. The oval shape of needle 184 is an improvement over existing frustoconical heads because the oval shape no longer has any sharp edges capable of cutting or otherwise damaging the rubber material of valve 130. As discussed above, the shape of needle 184 may comprise any shape that does not have defined edges, such as a rounded and substantially spherical-shape. For example, U.S. Pat. No. 6,883,564 discloses a needle having a substantially frustoconical shaped needle head or point, defined by a rounded apex and a circular edge defining the terminating distal end of the head or point. Head portion 190 of Needle 184 of the present invention does not have the rounded frustoconical head portion, rather it is oval or substantially spherical in shape. Specifically, head 190 does not have a defined circular edge at its distal end. This improvement in the shape of head portion 190 of needle 184 not only preserves the structural integrity of valve 130, as discussed above, but it additionally allows valve 130 to be opened to facilitate a de-pressurization configuration of valve 130 that is discussed in view of FIGS. 8 and 10, infra.

In some non-limiting embodiments dock 182 may be generally collar sized and contoured to guide canister 102 into an orientation in which valve 130 is aligned with pressurization needle 184 on pressurization station 140. Dock 182 may have a cylindrically tubular lower portion 198 (approximately 0.53 inch in height) having an inner diameter (e.g., 1.980 inches) which is just slightly larger (e.g., 0.010 inch clearance) than the outer diameter at the lower end of the canister 102 (e.g., 1.970 inches), and an upper portion 200 with a surface 202 beveled outward relative to the inner surface of the lower portion 204. The upper portion 200 bevels out to an inner diameter of, e.g., 2.060 inches; i.e., preferably approximately 0.090 inch greater than the lower end of the container. The dock 182 has a total height of preferably approximately 0.780 inch, with the lower portion 204 having a height of preferably approximately 0.53 inch, and upper portion 200 having a height of preferably approximately 0.23 inch. When canister 102 is positioned at dock 182, even at an angle, beveled surface 202 guides the lower end of canister 102 into lower portion 204. In this manner, interior space 144 of valve 130 is automatically aligned relative to needle 184 without user concern for a misalignment, which could otherwise cause valve 130 puncture or wasted user time with respect to alignment.

Figure 5:
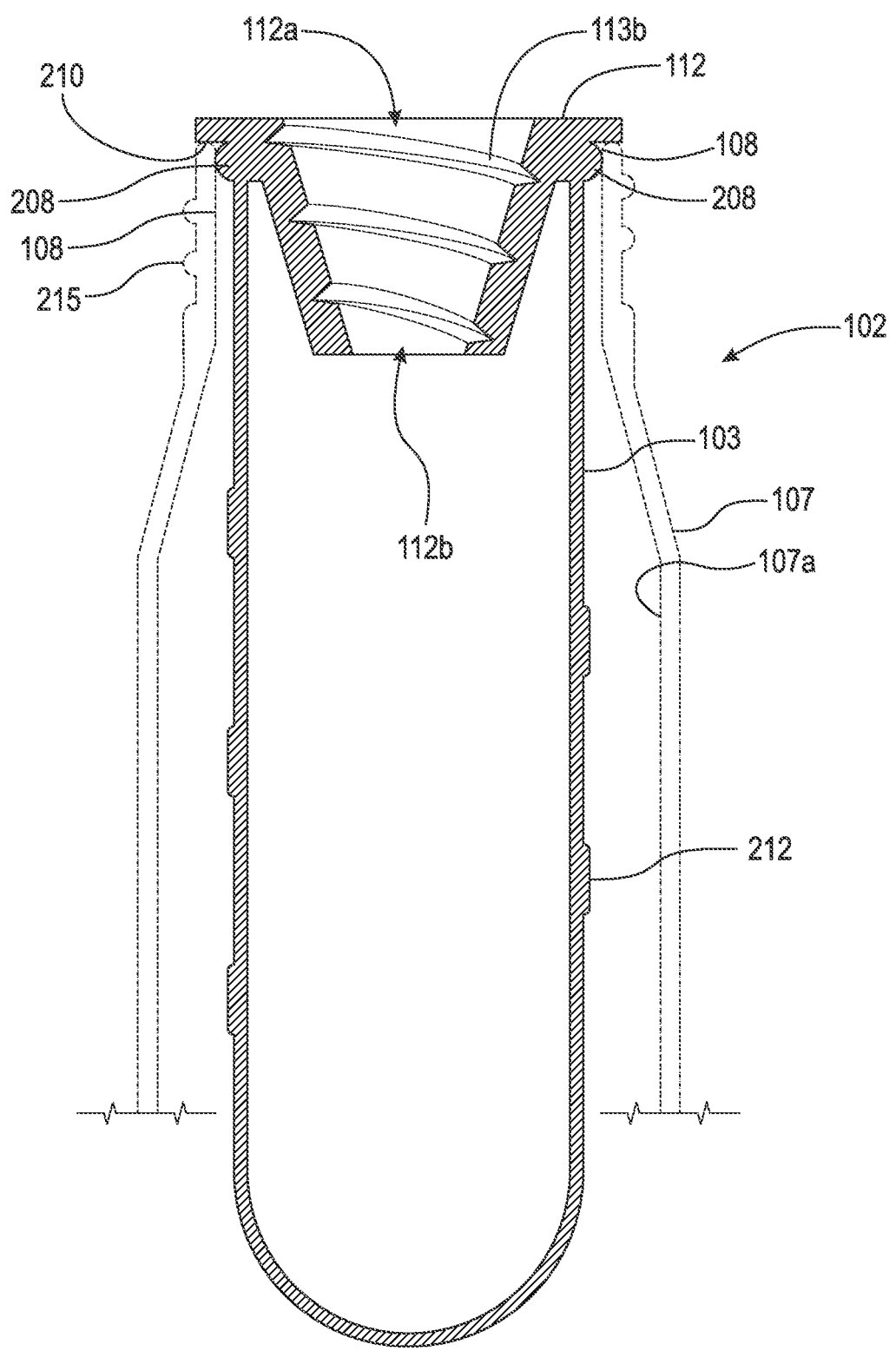
FIG. 5 is a sectional view of the bag within the canister taken generally along lines 5-5 in FIG. 1A of the present invention.

Adverting now to FIG. 5; illustrating a sectional view of bag 103 within canister 102 taken generally along lines 5-5 in FIG. 1. Bag opening 112 is seated within opening 108 of canister 102. Bag opening 112 includes annular ridge 208 that is arranged to sealably engage inner wall 107a of opening 108 and circumferential sidewall 107 of canister 102. Seal point 210 is created via the combination of annular ridge 208 and the lip of opening 112 when bag 103 is engaged within canister 102, as discussed supra. Opening 112 also includes threads 113b that are arranged to accept threading 113a of valve cup 113. Also shown is upper aperture 112a of bag opening 112. Upper aperture 112a is arranged to be a circumference greater than that of lower aperture 112b. Lower aperture 112b opens into the inside of bag 103.

Figure 6:
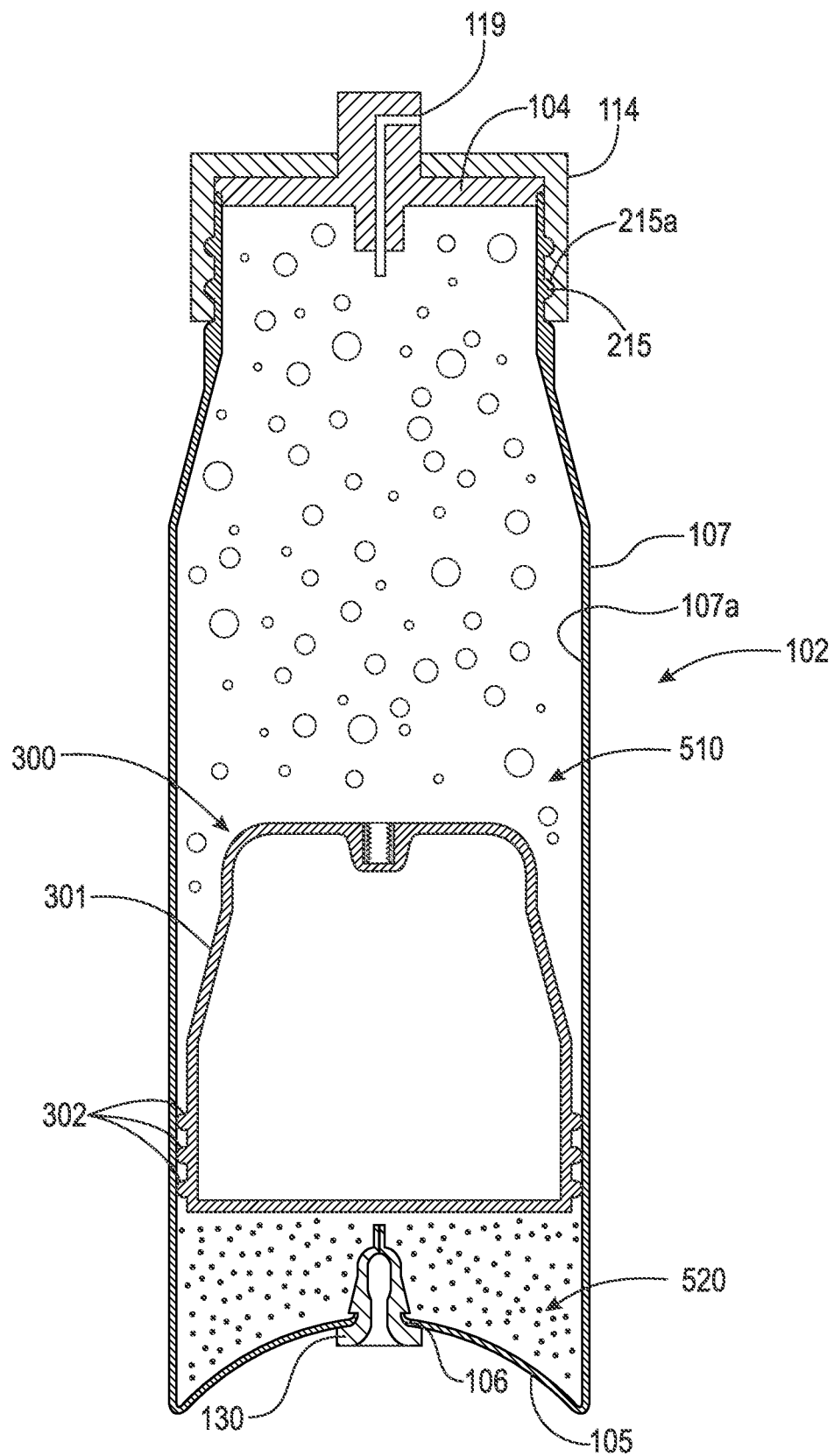
FIG. 6 is a cross-sectional view of the second embodiment of the canister shown in FIG. 5 engaging the needle of the pressurization station.

Adverting now to FIG. 6, illustrating a second and preferred embodiment of the present invention. As previously discussed, a bag may present various issues such as puncturing or sticking to the inside walls of the canister of the present invention. The second embodiment aims to alleviate these problems by replacing the bag apparatus discussed supra with deformable piston 300. It should be appreciated that all of the discussed components of the present invention still apply with the second embodiment of canister 102 shown in FIG. 6 with the exception of bag 103, and valve cup 113. In the second embodiment of the present invention, actuator 104 is directly connected to the inside of canister 102 and is still fixedly attached to opening 108 via cover piece 114. Threads 215 engage threads 215a of cover piece 114 to sealably secure cover piece 114 and actuator 104 to opening 108 in an airtight manner.

Deformable piston 300 is preferably constructed from a medium-soft flexible silicone and is configured to include plurality of annular ridges 302 arranged on outside surface 301 of piston 300. Annular ridges 302 resemble a plurality of O-rings that are fixed to outside surface 301 of piston 300. Piston 300 may be comprised of any other suitable plastic or silicone combination, or silicone and metal combination such that it may be deformably and forcibly removed through opening 108 of canister 102 (shown in FIGS. 10 and 11, discussed infra). Ridges 302 of piston 300 are arranged to contact inner wall 107a of opening 108 and circumferential sidewall 107 of canister 102. This contact creates a seal between upper chamber 510 and lower chamber 520, defined by piston 300. Upper chamber 510 is where dispensable substances are stored when canister 102 is filled and lower chamber 520 is pressurized via pressurization station 105.

Figure 10:
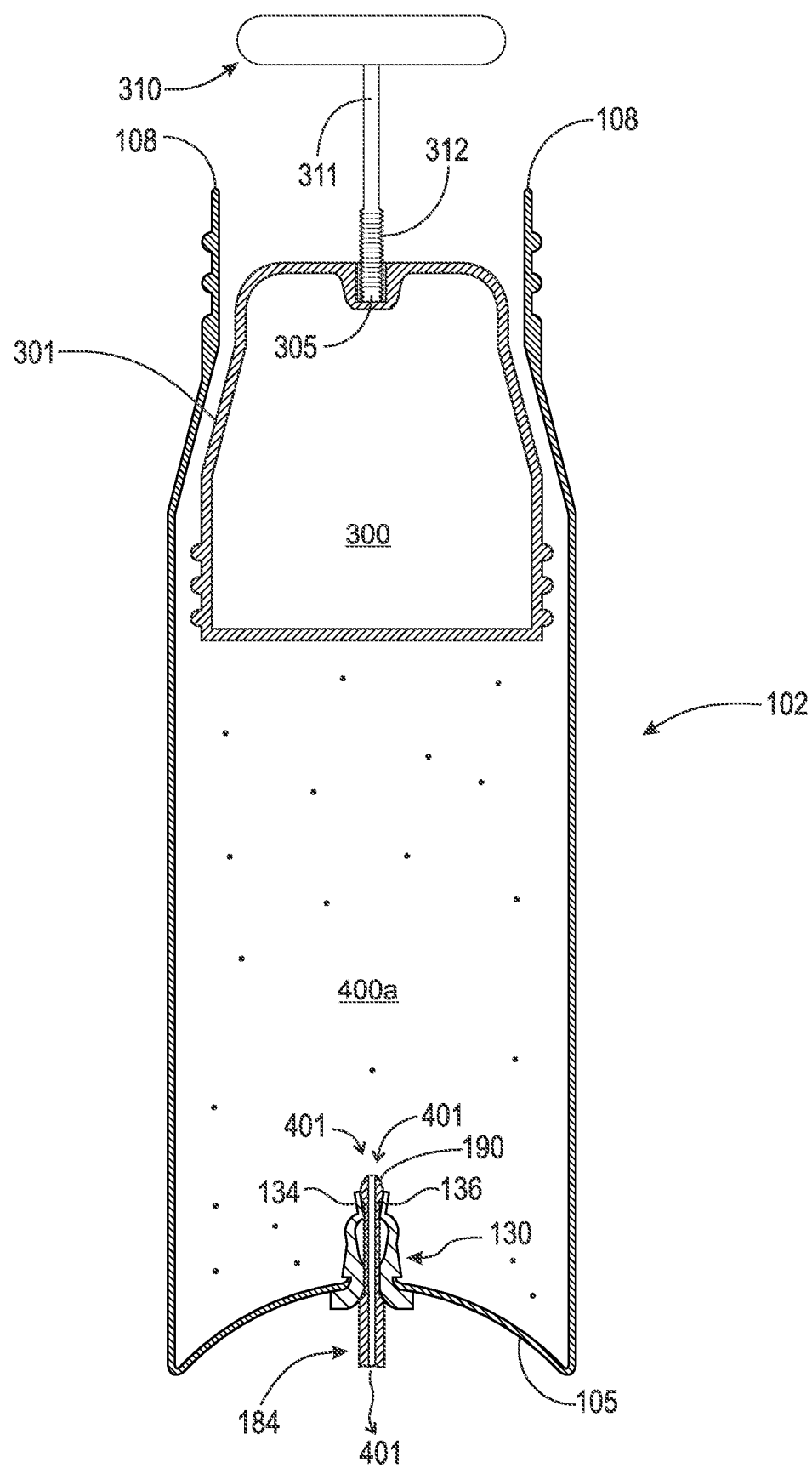
FIG. 10 is a cross-sectional view of the second embodiment of the canister shown in FIG. 5 engaging the needle of the pressurization station in the second engagement position shown in FIG. 8; and, FIG. 11 is a partial cross-sectional view of the second embodiment of the canister shown in FIG. 5 illustrating the procedure for removal of the internal deformable piston.
Figure 11:
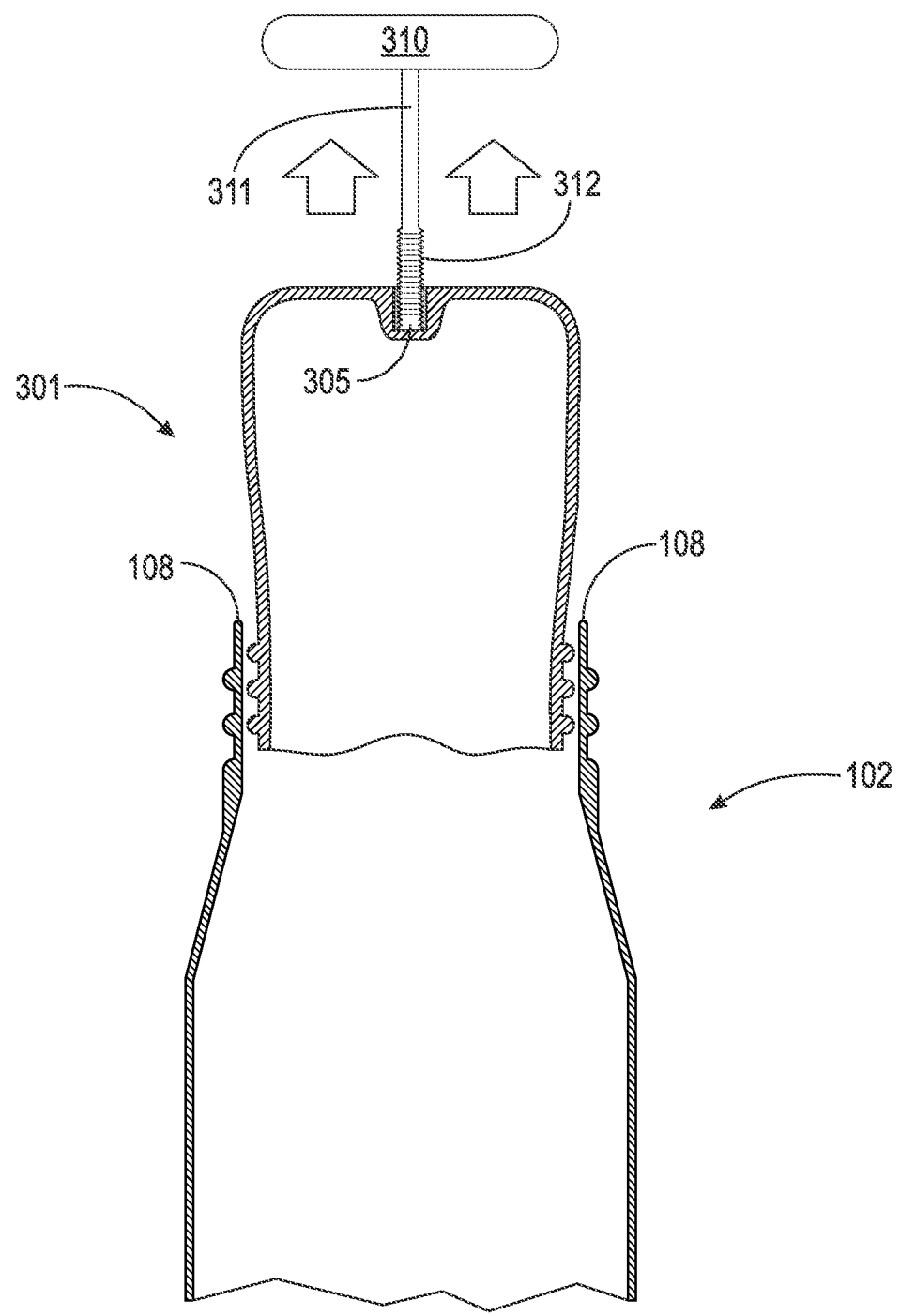

Piston 300 may comprise various different constructions. In one possible configuration, piston 300 may be substantially hollow and include an aperture on its distally arranged bottom surface that would lead to an internal cavity. This hollow configuration would allow piston 300 to inflate when canister 102 is pressurized, further sealing annular ridges 302 against inner wall 107a of opening 108 and circumferential sidewall 107 of canister 102. The hollow configuration also would allow piston 300 to deflate when canister 102 is de-pressurized, making piston 300 easier to remove from opening 108, as shown in FIGS. 10 and 11, discussed further infra.

In use, during a first filling, actuator 104 and valve cup 113 may be removed from canister 102 and a selected content such as a liquid is poured through the open end of the canister 102 into bag 103. Valve cup 113 is then placed on bag 103 and then actuator 104 is connected to valve cap. Cover piece 114 is then threaded back onto the canister 102 until the canister is closed and an airtight seal is created. It should be appreciated that in the second embodiment of the present invention, valve cup 113 and bag 103 are absent. Thusly, during a first filling, actuator 104 and cover piece 114 may be removed from canister 102 and a selected content such as a liquid is poured through opening 108 directly into upper camber 510, defined by the top surface of piston 300. Cover piece 114 is then threaded back onto canister 102 to secure actuator 104 to opening 108, creating an airtight seal. For both embodiments of the present invention, canister 102 is then inserted into dock 182 such that needle 184 is inserted into valve 130. The tapered end of the head 190 of the needle 184 and flared opening 174 of the valve 130 facilitate the coupling between needle 184 and valve 130 such that canister 102 and valve 130 may be coupled with relatively little user force.

The following description should be taken in view of FIGS. 1A-6. When canister 102 is fully seated in dock 182 and fully seated on the needle 184 and no pressurizing force is present, head 190 of the needle 184 resides within a first portion 170 of interior space 144 and neck 192 of the needle 184 resides in the narrower neck portion 172 of the space, and the split valve 130 remains closed. This prevents any of the fluid contents of the canister 102 from escaping.

When the compressor of pressurization station 150 is operated, e.g., by actuation of switch 150*a*, gas, e.g., air, under pressure is forced through needle 184 and into valve 130. This causes the bills 134 and 136 of valve 130 to flutter open such that the gas pressurizes canister 102. Furthermore, as the pressure within canister 102 increases, the force against valve 130 from canister 102 contents increases. As such, the force of the contents against the frustoconical portion 138 of valve 130 decreases the diameter of neck portion 172 of interior space 144. This captures head portion 190 of needle 184 within valve 130 and prevents canister 102 from blowing off needle 184, even at maximum fill pressure, e.g., 70 to 100 psi. Preferably, pressurization station 150 includes means for automatically deactivating the compressor 182 when a desired fill pressure is reached. As soon as the compressor is turned off, bills 134 and 136 of valve 130 close; preventing any backflow of the contents through valve 130.

Canister 102 may then be removed from the pressurization station 150. Spray nozzle 119 may then be depressed to release the contents of bag 103, or upper chamber 510 in the second embodiment. When canister 102 is depressurized (either partly or completely), i.e., after significant use or after removal and replacement of cover piece 114, and actuator 104 from the canister, canister 102 may be positioned within dock 182 of pressurization station 150, and re-pressurized as described above.

Figure 7:
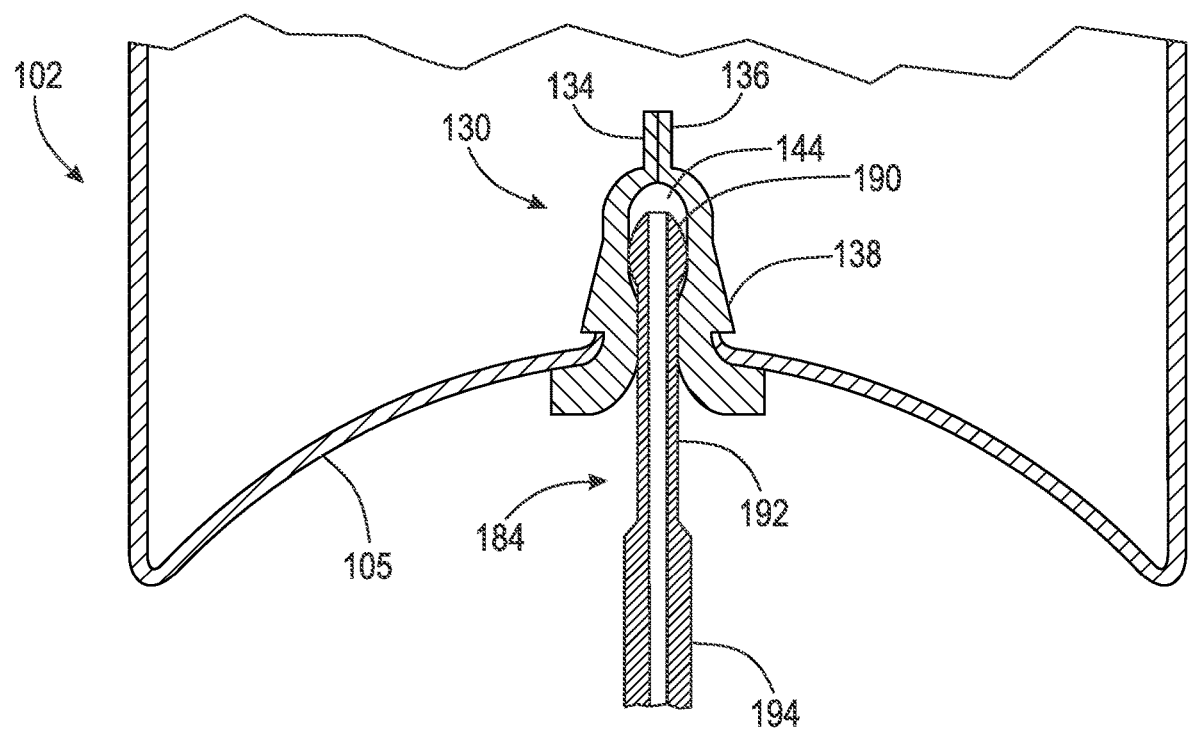
FIG. 7 is a partial view of the canister and valve engaging the needle of the pressurization station of the first and second embodiments of the present invention in a first engagement position.
Figure 8:
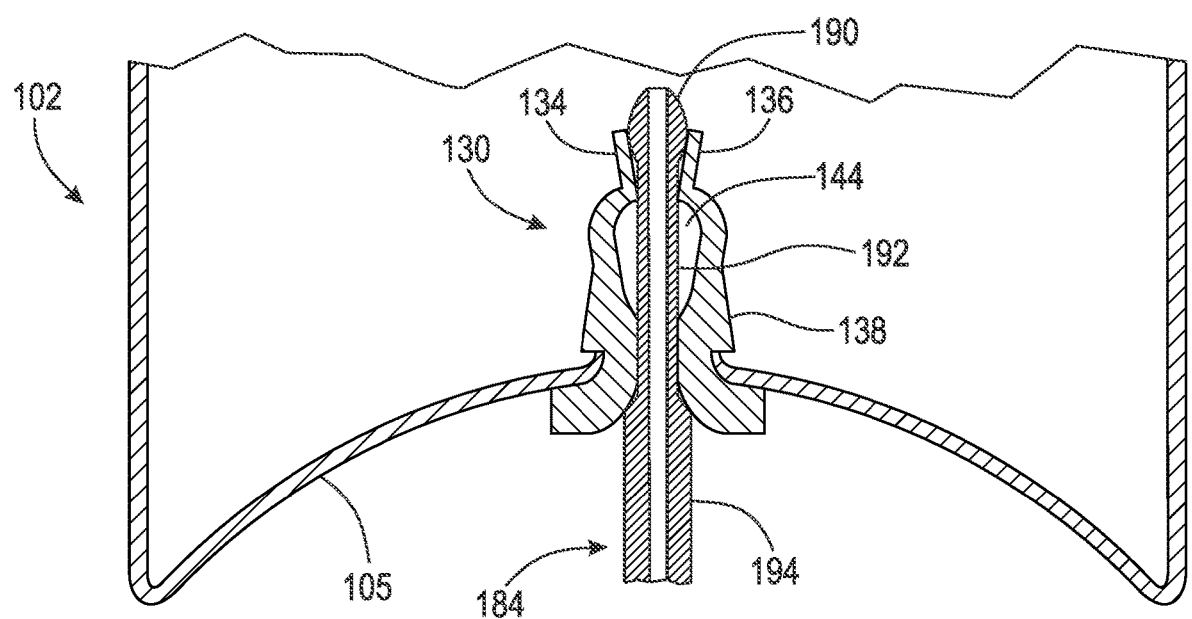
FIG. 8 is a partial view of the canister and valve engaging the needle of the pressurization station of the first and second embodiments of the present invention in a second engagement position.

The following description should be taken in view of FIGS. 7-10. FIG. 7 is a partial view of the canister and valve engaging the needle of the pressurization station of the first and second embodiments of the present invention in a first engagement position. FIG. 8 is a partial view of the canister and valve engaging the needle of the pressurization station of the first and second embodiments of the present invention in a second engagement position. It should be appreciated that FIG. 7 (first engagement position) corresponds with the sectional view of the second embodiment of the present invention shown in FIG. 9 and that FIG. 8 (second engagement position) corresponds with the sectional view of the second embodiment of the present invention shown in FIG. 10. Notwithstanding, the engagement positions illustrated in FIGS. 7 and 8 also apply to the first embodiment of the present invention.

Figure 9:
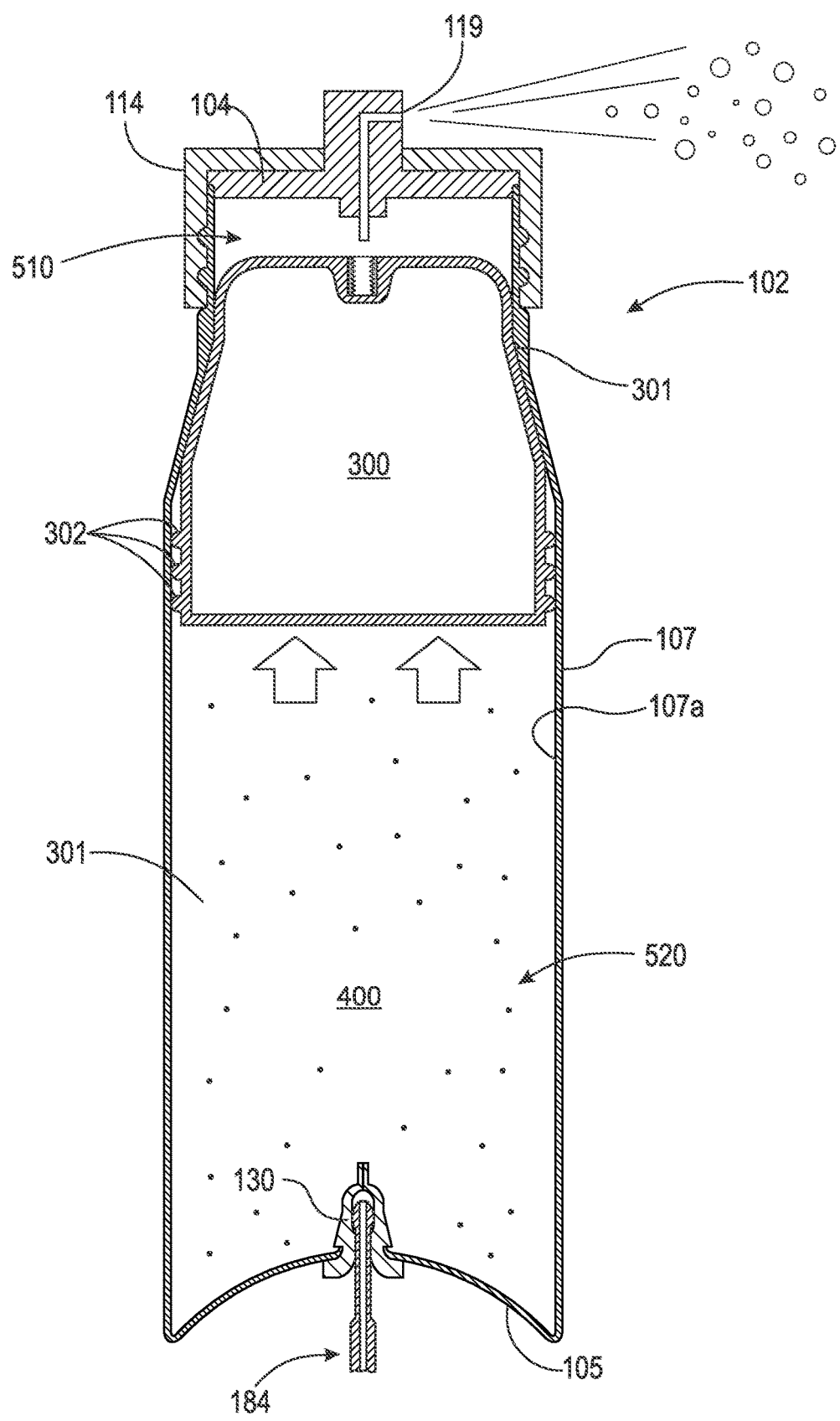
FIG. 9 is a cross-sectional view of the second embodiment of the canister shown in FIG. 5 engaging the needle of the pressurization station in the first engagement position shown in FIG. 7.

Valve 130 is illustrated in a first engagement position with needle 184 in FIG. 7. When valve 130 of canister 102 is engaged to needle 184, whereas head portion 190 of needle 184 is inserted within interior space 144 of valve 130. This first engagement position allows pressurization of lower chamber 520. Gas that is pushed through needle 184 pressurizes interior space 144 until upper spilt portion 132 of valve 130 opens first bill 134 and second bill 136 to allow gas to enter lower chamber 520 of canister 102 (Described further supra in view of FIGS. 2 and 3). With respect to the second embodiment of the present invention, gas 400 fills lower chamber 520 creating an upward force on the distal end of piston 130. When actuator 104 is actuated, gas 400 pushes piston 130 upwardly, along inside surface 107*a* of canister 102 towards nozzle 119 and expels a dispensable substance that is within upper chamber 510, as shown in FIG. 9.

Valve 130 is illustrated in a second engagement position with needle 184 in FIG. 8. When valve 130 of canister 102 is engaged to needle 184, whereas head portion 190 of needle 184 is inserted within interior space 144 and within the seam created via first bill 134 and second bill 136 of split upper portion 132 of valve 130. This second engagement position allows for depressurization of lower chamber 520 of canister 102 allowing gas 400*a* to exit 401 through head 190 of needle 184 that is protruding through the opened spilt upper portion 132 of valve 130, as shown in FIG. 10. It should also be appreciated that pressurization station 150 may facilitate exit 401 of gas 400*a* by applying a suction to needle 184. The suction feature of station 150 will reset piston 300 in a manner shown in FIG. 6.

Also illustrated in FIGS. 10 and 11 is removal tool 310 that facilitates pulling piston 300 through opening 108 for cleaning or replacement. On the top surface of piston 300 is through-bore 305, that may be threaded. Removal tool 310 has neck 311 that terminates to threaded end 312 which is arranged to engage through-bore 305. Due to the deformable construction of piston 300, removal tool 310 may be used to forcibly pull piston out from within canister 102. It should also be appreciated that removal tool 310 and through-bore 305 may still be used on an inflatable configuration of piston 300, whereas removal tool 310 may assist a user to remove a deflated piston 300 through opening 108 of canister 102.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

REFERENCE NUMERALS 100 reusable dispensing container system
102 canister
103 bag
104 actuator
104a attachment means to actuator 104
105 base
106 aperture
107 canister circumferential sidewall
107a inside surface of canister 102
108 circular opening
112 bag opening
113 valve cup
113a threading of valve cup 113
114 canister cover piece
115 lid
119 nozzle
126a bottom
127 dip tube
128a hole
130 valve
130a valve
132 upper split portion of valve 130
132a upper split portion of valve 130a
134 first bill of upper split portion of valve 130
136 second bill of upper split portion of valve 130
138 frustoconical section of valve 130
140 barb of valve 130
140a barb
142 lower annular flared flange
142a flange
144 interior space of valve 130
145a annular groove
146 annular catch
148 annular strain relief member
150 pressurization station
150a power button of pressurization station 150
151 ring groove of annular catch 146
152 O-ring
156 barb projection of annular catch 146
158 inner rim of annular catch 146
160 side wall of annular catch 146
162 upper barb of annular strain relief 148
164 groove of annular strain relief 148
166 edges
166a edge
170 first portion of interior space 144
172 neck portion of interior space 144
174 flared portion of interior space 144
180 housing
182 dock/compressor
184 needle
190 head portion of needle 184
192 neck portion of needle 184
194 base portion of needle 184
196 axial through-bore of needle 184
198 tubular lower portion of dock 182
200 upper portion of dock 182
202 surface of upper portion 200
204 lower portion of dock 182
212 ridges of bag 112
215 threading
300 piston
301 outside surface of piston 300
302 annular ridges of outside surface of piston 300
305 through-bore
310 removal tool
311 neck of removal tool 310
312 threading of neck 311
400 gas
400a gas
401 exit of gas 400
510 upper chamber of canister 102
520 lower chamber of canister 102

What is claimed is:

1. A reusable dispensing container assembly, comprising:
a canister having a first end and a second end, said canister having an upper chamber to hold dispensable substance;
an actuator arranged proximate said first end of said canister, in communication with said chamber, said actuator having a nozzle arranged to eject said dispensable substance;
a deformable piston arranged within said canister below said upper chamber, said piston further arranged to sealingly engage an inner surface of said canister, said piston arranged for upward movement within said canister when said actuator is actuated, said deformable piston forming a lower chamber arranged to hold pressurized gas, said deformable piston comprising at least one integral external O-ring about its circumference arranged to sealingly engage said inner surface of said canister and maintain separation of said dispensable substance and said pressurized gas; and,
a pressurization station having a pressurizing and de-pressurizing needle, said needle having a rounded tip, said pressurization station operatively arranged to pressurize said canister to permit upward movement of said deformable piston when said actuator is actuated to dispense said dispensable substance through said nozzle.

2. The reusable dispensing container assembly recited in claim 1 wherein said canister further comprises a valve arranged on said second end of said canister, said valve is arranged to accept said needle.

3. The reusable dispensing container assembly recited in claim 2 wherein said valve further comprises:
an upper split portion having two bills; and,
an interior cavity having a first portion defined by said upper spilt portion of said valve, said interior cavity having a neck portion, said interior cavity having a flared portion distally arranged in relation to said first portion,
wherein said flared portion of said interior space of said valve is arranged to accept said needle; and,
wherein said first portion of said interior space of said valve is arranged to accept said needle, said rounded tip of said needle is operatively arranged to spilt said bills of said upper split portion of said valve.

4. A reusable dispensing container assembly, comprising:
a canister having a first end and a second end, said canister having an upper chamber to hold dispensable substance;

an actuator arranged proximate said first end of said canister, in communication with said chamber, said actuator having a nozzle arranged to eject said dispensable substance;

a deformable piston arranged within said canister below said upper chamber, said piston further arranged to sealingly engage an inner surface of said canister, said piston arranged for upward movement within said canister when said actuator is actuated, said deformable piston forming a lower chamber arranged to hold pressurized gas, said deformable piston comprising at least one integral external O-ring about its circumference arranged to sealingly engage said inner surface of said canister and maintain separation of said dispensable substance and said pressurized gas; and, a pressurization station having a pressurizing and de-pressurizing needle, said needle having a rounded tip, said pressurization station operatively arranged to pressurize said canister to permit upward movement of said deformable piston when said actuator is actuated to dispense said dispensable substance through said nozzle;

wherein said pressurization station is operatively arranged to depressurize said canister to permit downward movement of said deformable piston when said deformable piston is positioned at the apex of said upper chamber of said canister.

5. A reusable dispensing container assembly, comprising:

a canister having a first end and a second end, said canister having an upper chamber to hold dispensable substance;

an actuator arranged proximate said first end of said canister, in communication with said chamber, said actuator having a nozzle arranged to eject said dispensable substance;

a deformable piston arranged within said canister below said upper chamber, said piston further arranged to sealingly engage an inner surface of said canister, said piston arranged for upward movement within said canister when said actuator is actuated, said deformable piston forming a lower chamber arranged to hold pressurized gas, said deformable piston comprising at least one integral external O-ring about its circumference arranged to sealingly engage said inner surface of said canister and maintain separation of said dispensable substance and said pressurized gas; and, a pressurization station having a pressurizing and de-pressurizing needle, said needle having a rounded tip, said pressurization station operatively arranged to pressurize said canister to permit upward movement of said deformable piston when said actuator is actuated to dispense said dispensable substance through said nozzle;

wherein said pressurization station is operatively arranged to engage said canister and create suction within said canister to pull said deformable piston distally in the direction of said second end of said canister.

6. The reusable dispensing container assembly recited in claim 1, wherein said piston is hollow.

7. The reusable dispensing container assembly recited in claim 6, wherein said hollow piston includes an internal cavity in communication with said pressurized gas, wherein said pressurized gas causes said piston to expand against an inner wall of said canister.

8. The reusable dispensing container assembly recited in claim 3, wherein said needle of said pressurization station is arranged pressurize said canister by engaging said needle with an interior space of said valve.

9. The reusable dispensing container assembly recited in claim 3, wherein said needle of said pressurization station is arranged depressurize said canister by engaging said needle between said two bills of said upper spilt portion of said valve.

10. The reusable dispensing container assembly recited in claim 7, wherein said hollow piston includes a top surface having an aperture, said aperture arranged to removably accept a removal tool.

11. The reusable dispensing container assembly recited in claim 7, wherein said hollow piston is comprised of a deformable material, said removal tool is arranged to engage said piston to forcibly remove by deformation said piston from an opening of said canister.

* * * * *